Figure 1:
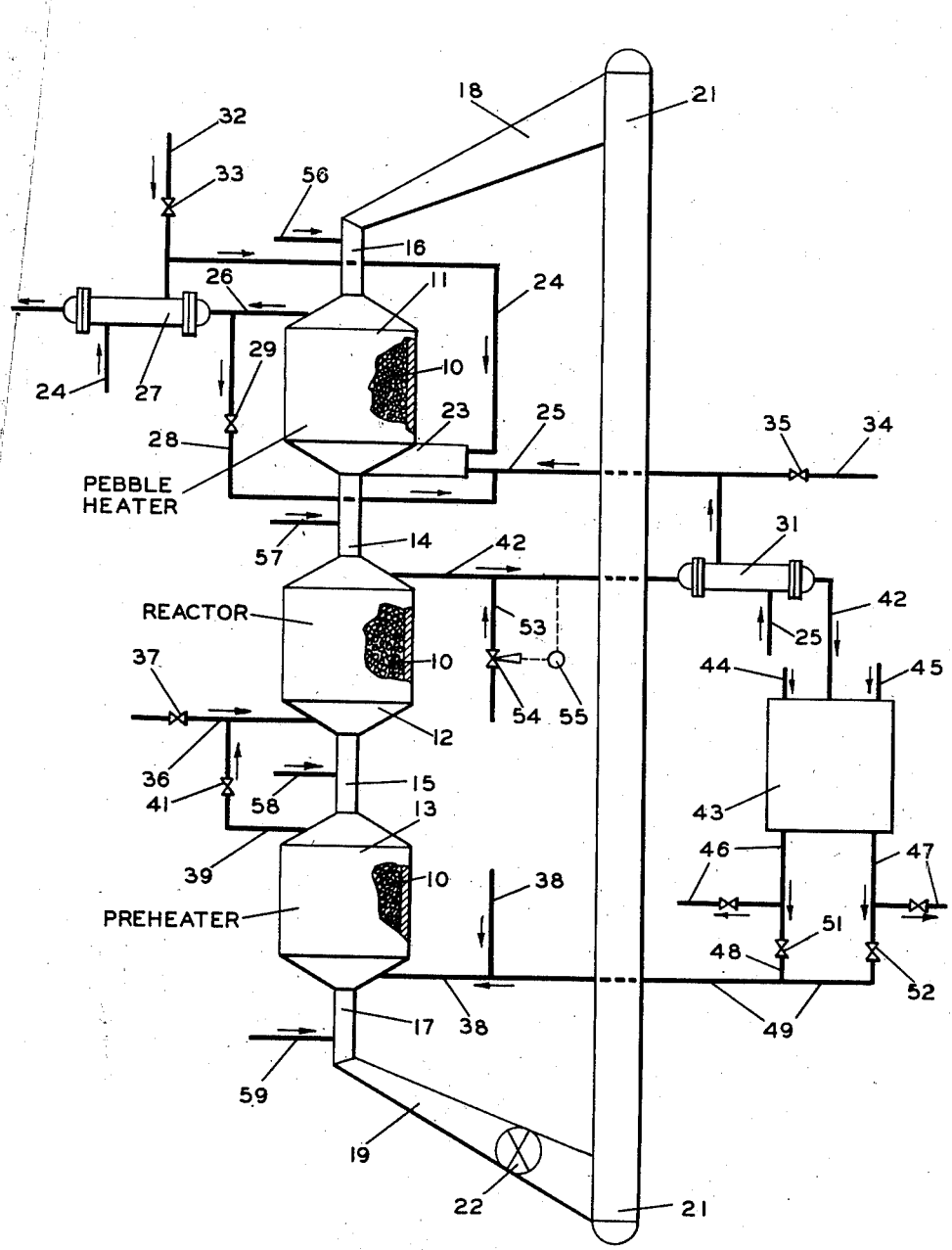

INVENTOR.
CHARLES W. PERRY

May 13, 1952  C. W. PERRY  2,596,507
MANUFACTURE OF HCN

Filed June 17, 1946  2 SHEETS—SHEET 2

INVENTOR.
CHARLES W. PERRY
BY Hudson & Young

ATTORNEYS

Patented May 13, 1952

2,596,507

UNITED STATES PATENT OFFICE 2,596,507

MANUFACTURE OF HCN

Charles W. Perry, Bartlesville, Okla., assignor to Phillips Petroleum Company, a corporation of Delaware Application June 17, 1946, Serial No. 677,357

8 Claims. (Cl. 23—151)

This invention relates to the synthesis of hydrocyanic acid. One specific embodiment of the invention pertains to the synthesis of HCN from $NH_3$ and CO. Another embodiment relates to the production of HCN by reacting $NH_3$ and a low molecular weight hydrocarbon.

It is an object of the invention to provide an improved continuous process for manufacturing HCN.

Another object of this invention is to provide an improved method of supplying heat for a continuous process for synthesizing HCN.

A further object of the invention is to provide a process for producing HCN at high conversion rates and relatively low cost.

Other objects of this invention will become apparent from the accompanying disclosure.

It is found that HCN can be produced rapidly in large yields at low cost by contacting a stream of gas comprising $NH_3$ and either CO or a low molecular weight hydrocarbon with small, hot particles of heat transfer material which may be catalytic or non-catalytic with respect to the reaction.

In one embodiment of the invention, pebbles of refractory heat-transfer material are continuously flowed by gravity thru a series of zones, including a heating zone, and a reaction zone, in a fluent mass and are simultaneously contacted in the heating zone with a stream of hot gas and in the reaction zone with a stream of the reactants. The pebbles are heated to a temperature substantially above a predetermined reaction temperature and, as they pass thru the reaction zone in contact with the reactants, the latter are quickly heated to reaction temperature and converted to HCN. Thus the hot pebbles continuously entering the reaction zone are at a temperature sufficient to supply the heat required to raise reactant gases to reaction temperature and also to supply the heat required for the reaction. Pebble temperatures of at least 100° F. above reaction temperature are required and it is desirable at times to operate utilizing pebble inlet temperatures of several hundred degrees above reaction temperature. During their passage thru the reaction chamber, pebble temperature drops several hundred degrees and pebbles require reheating. Hence the pebbles are elevated by gas, bucket, or screw type elevator to a chute above the heating chamber and are again allowed to flow by gravity thru the heating and reaction zones. Pebble flow is conveniently regulated by a star feeder located in the chute leading from the outlet from the last pebble chamber to the elevator. It is also feasible to regulate pebble flow thru the system by controlling the rate of operation of the elevator.

The term "pebble" as used thruout this specification denotes any refractory material in fluent form and size which will flow readily by gravity thru the various chambers of a pebble heater apparatus without entrainment in feed and heating gases flowing countercurrently. Pebbles are preferably substantially spherical and are about $\frac{1}{8}''$ to $1''$ in diameter with the preferred range from about $\frac{1}{4}''$ to $\frac{1}{2}''$. They must be rugged, tough, and resistant to wear in order to function economically in pebble heater operation.

For straight thermal synthesis, pebbles of relatively pure alumina heat-treated at extremely high temperatures to render them substantially non-porous and glazed are most satisfactory. Pebbles of beryllia, "Carborundum," mullite, periclase, and zirconia, when properly fired, serve very well in the process of the invention. Where a dual purpose pebble, providing heat-transfer and catalytic functions, is desirable, pebbles of active alumina, alone, or impregnated with metal oxides of groups 3, 4, 5, and 6 of the periodic table, are effective. Alumina having a minor amount of one or more of the oxides of Th, Zr, Ce, V, and U incorporated therein is most desirable. Any of the conventional catalysts for promoting the reaction between $NH_3$ and CO or hydrocarbons may be incorporated in a refractory pebble, such as alumina, and used in the process of the invention. Metals having a strong dehydrogenating effect, such as iron, should be avoided since they tend to cause complete breakdown to N, C, and H.

For a more complete understanding of this embodiment of the invention reference may be had to Fig. 1 of the drawing which is a diagrammatic showing of a preferred arrangement of apparatus for performing the invention. Chambers 11, 12, and 13 are heat-insulated chambers inclosing a fluent mass of refractory pebbles 10 and connected by conduits 14 and 15 which form neck-like passageways between chambers and enclose a portion of the fluent mass of pebbles. Conduits 16 and 17, connecting chutes 18 and 19 respectively, with elevator 21, serve to convey pebbles to heating chamber 11 and from preheater 13, respectively. Elevator 21 may be any type of conveyor such as a gas lift, a screw, or a bucket elevator, but the last is preferred.

In operation, pebbles are continuously passed into chute 18 from elevator 21 and descend successively thru inlet conduit 18, chamber 11, neck 14, chamber 12, neck 15, chamber 13, outlet conduit 17, chute 19 and star valve 22 (or other type of feeder) to elevator 21. By proper control of star valve 22, the rate of pebble flow thru the apparatus can be coordinated with flow of reactants and gas temperature in heater 11 to maintain the desired reaction temperature in reaction chamber 12. Increasing the flow rate of pebbles increases the amount of heat available in reaction chamber 12 as does also an increase in pebble inlet temperature. Heat absorbed in reactor 12 depends upon the particular reactants and the temperature differential between reactant inlet temperature and effluent temperature. By controlling these variable factors, the reaction temperature may be carefully controlled.

Simultaneously with the flowing of pebbles thru the system just described, a countercurrent stream of hot gas, such as combustion gas, is continuously passed thru pebble heater 11. Air and fuel gas are fed to furnace or burner 23 thru lines 24 and 25, respectively, and burned to produce the desired temperature in chamber 11. Combustion gas passing out of chamber 11 is conducted via line 26 thru heat-exchanger 27 which may conveniently preheat the air stream in line 24 where extremely high temperatures are desired. It is also desirable to recycle flue gas to pebble heating chamber 11 via line 28 controlled by valve 29. Likewise, fuel may be desirably preheated in heat-exchanger 31 in line 25. Lines 32 and 34 controlled by valves 33 and 35, respectively, are auxiliary air and fuel lines, respectively. In operating with catalytic pebbles it may be desirable to introduce other gases into the pebble heating zone in addition to hot combustion products in order to properly condition the catalyst. Steam or other treating gas may be introduced thru lines 24 and/or 25. An excess of air over that required to oxidize the fuel may be introduced thru line 24 in order to burn off any carbon deposited on the pebbles in chamber 12 by cracking of hydrocarbons.

As hot pebbles flow thru reaction chamber 12, they are contacted by a countercurrent stream of reactants comprising $NH_3$ and a suitable carbon-containing gas which reacts with the ammonia to form HCN. The feed gas is admitted thru line 36 controlled by valve 37 when operating at lower temperatures and/or when it is not desired to use chamber 13 for preheating the feed and further reducing the temperature of the pebble stream for reasons discussed subsequently. As the feed gases pass thru reactor 12, they are quickly brought to reaction temperature and reaction takes place, absorbing heat from the pebble stream. In this manner the hotter pebbles supply heat for the endothermic reaction and the cooler pebbles heat up the feed to reaction temperature, thus providing highly efficient heating.

Reaction temperatures will vary with the feed and the type of material in the pebbles. When operating with a feed comprising $NH_3$ and CO and ⅜" porous alumina pebbles, reaction temperatures can vary from about 750° to 1500° F., but a reaction temperature of about 900° F. is preferred. The mol ratio of $NH_3$ to CO in the feed may vary from about 1:25 to 1:0.5. When operating with $NH_3$ and a light hydrocarbon as the feed, temperatures will vary with the type of hydrocarbon. Saturated hydrocarbons require considerably higher temperatures than the unsaturated and their reaction with $NH_3$ is not influenced so much by catalysts. Temperatures of about 1800° F. are required to react saturated hydrocarbons with $NH_3$ and reaction temperatures up to 2500° F. are desirable in catalytic conversion operations. When using relatively non-catalytic pebbles such as glazed, non-porous alumina, temperatures of about 2250° F. to 3000° F. are required for reaction of saturated hydrocarbons with $NH_3$. Unsaturated hydrocarbons react with $NH_3$ suitably in the presence of catalysts in the range of about 850° to 1650° F., while temperatures from about 1500° to 3000° F. are suitable in the absence of a catalyst. (With hydrocarbons in the feed, the mol ratio of N to C may desirably vary in the range of from about 1:5 to 1:0.3.) High temperatures and short reaction times when operating with hydrocarbons in the feed without the aid of strong catalysts are quite essential to good yields. Long heating periods at high temperatures promote decomposition of both the hydrocarbon and $NH_3$, especially when the hydrocarbon is saturated. Contact with metal surfaces likewise promotes complete decomposition of the reactants and lower yields. Pebble heater apparatus is ideally suited to production of HCN from $NH_3$ and hydrocarbons because of the extremely rapid heating and high temperatures obtainable in this type of apparatus. Temperatures of upwards of 3000° F. and heating rates from 50 to 100 times faster than obtainable in ordinary tube reactors are obtainable in pebble heater apparatus.

Reaction time varies with the temperature when either CO or hydrocarbons are included in the feed stream, higher temperatures requiring shorter reaction times. In the catalytic synthesis of HCN from $NH_3$ and CO, reaction times of about 0.1 to 2 seconds are desirable under the practiced range of reaction conditions. When operating with hydrocarbons in the feed, reaction times may vary from about 0.01 to 1 second according to temperature, the particular hydrocarbon feed, and other variable reaction conditions, the shorter reaction times being desirable when operating at high temperatures.

It is usually advantageous to preheat the feed to within about 100° to 1000° F. of the reaction temperature. When operating at 900° F. it is desirable to heat the feed to about 750° to 800° F., although heating to lower temperatures is also advantageous. In operating at temperatures of about 2500° to 3000° F., the feed should not be preheated much above 2000° F. since sharp heating from this temperature up produces greater yields of HCN and should be accomplished in the pebble heater reaction chamber.

When operating at the higher temperature levels, such as 1800° F. and up, it is particularly advantageous to pass the feed thru a preheating chamber positioned in the line of pebble flow as 13 shown in Fig. 1. In such operation, pebbles leave chamber 12 at too high a temperature to be handled in ordinary elevator equipment; hence, passing feed via line 38 thru chamber 13 in contact with the hot pebble stream 10 suitably preheats the feed and reduces the temperature of the pebbles sufficiently to allow the use of ordinary elevator equipment in transferring pebbles from chute 19 to chute 18. The preheated feed is passed via line 39, controlled by valve 41, to feed line 36. The feed stream may be split, a portion entering thru valve 37 and the remainder thru valve 41, in order to provide flexible means of controlling both feed and pebble-exit temperatures.

Effluents from reaction chamber 12 pass via line 42 thru heat-transfer unit exchanger 31 to conventional product separation means 43 where HCN is separated and recovered. Lines 44, 45, 46, and 47 are product take-off lines. Lines 48 and 49 controlled by valves 51 and 52, respectively, are provided for recycling unreacted feed, $H_2$, ethylene, and/or acetylene to feed line 38. In operating at higher temperatures it adds considerably to the yield of HCN to quickly quench effluents in line 42 by means of a direct injection of cold fluid thru line 53 controlled by valve 54 thru automatic temperature controller-recorder 55 in accordance with a predetermined downstream temperature. Quenching to temperatures at which side reactions, polymerization, and decomposition of products cease is preferred. Water, ethylene glycol, or any other non-deleterious fluid may be used to advantage as quenching material, but of course, the vaporizing of a liquid in the effluent stream is the most efficient quench. Knocking the effluent stream down to about 600° F. is usually sufficient, but in some cases slightly lower and higher temperatures suffice. The effluent stream then passes thru heat-exchanger 31 in indirect heat-exchange with the fuel passing thru line 25 and is desirably reduced to about 150° to 300° F., before being passed to separation means 43.

Operation at pressures varying only slightly either side of normal atmospheric pressure is conducive of good results, but pressures of about 0.5 to 5 p. s. i. g. are preferred. Substantially equal pressures in the pebble chambers aid in preventing flow of gases from chamber to chamber. In some cases it may be desirable to operate with a non-deleterious blocking gas, such as steam, in necks 16, 14, 15, and 17 introduced thru lines 56, 57, 58, and 59, respectively. The same or different gases may be used in these necks.

Figure 2:
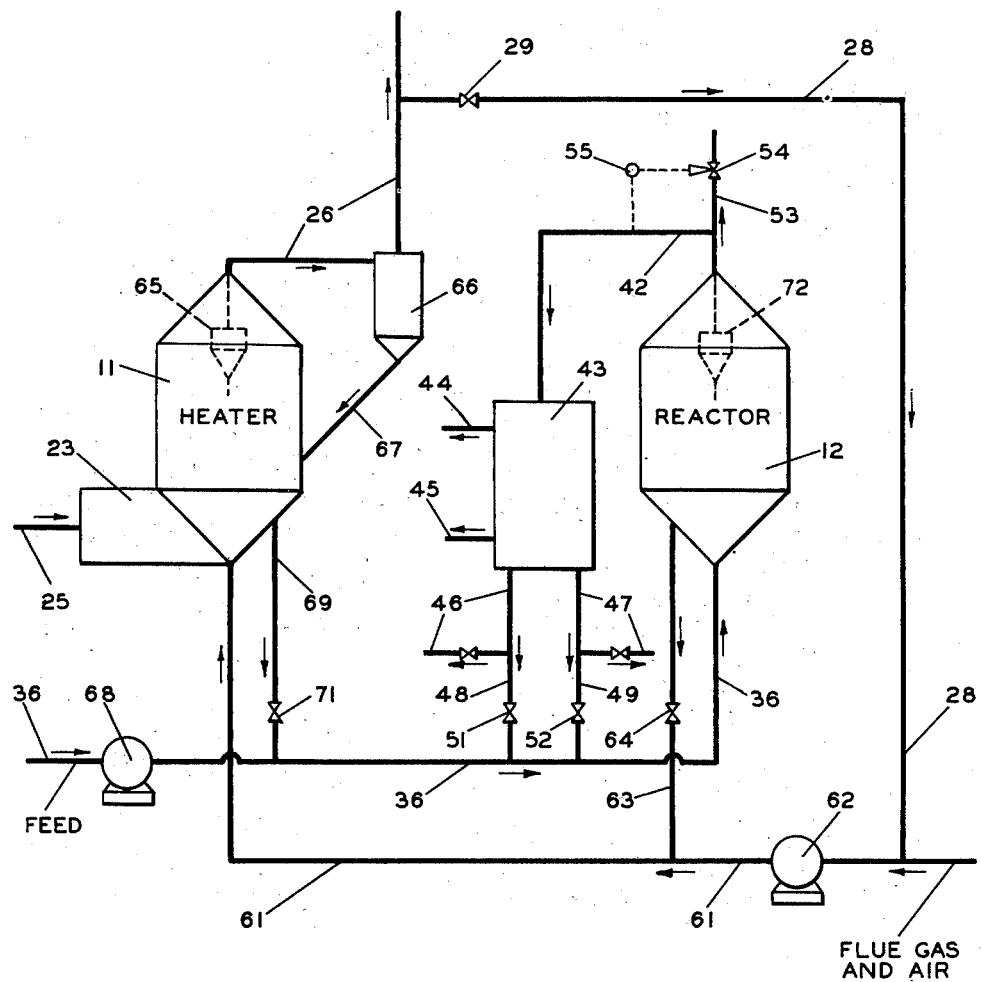

Figure 2 shows a diagrammatic arrangement of apparatus for performing another embodiment of the invention in which solid, catalytic, heat-transfer material in powdered form is passed successively thru a heating zone and a reaction zone and then back to the heating zone to repeat the cycle of conversion. Chamber 11 incloses a powdered catalyst heating zone and chamber 12 incloses a reaction zone. Hot flue gas which may contain a small percent of air is forced thru line 61 by blower 62, picks up powdered catalyst from reactor 12 via line 63 controlled by valve 64, and carries it into heater 11. When operating under conditions which cause carbon deposition on the catalyst particles, some heat is generated by burning off the carbon in heater 11. Where insufficient heat is generated in this manner to raise the catalyst temperature to the desired degree, additional heat may be generated in heater 11 by introducing hot flue gas directly from furnace 23 supplied by air and fuel thru line 25. Flue gas passes out thru cyclone separator 65 and line 26 in which is positioned precipitator 66 for removing any fines not removed by separator 65. The fines from separator 65 drop back into chamber 11 and also from precipitator 66 via line 67. Flue gas may be desirably recycled to line 61 via line 28 controlled by valve 29.

A desirable feed gas is passed thru line 36 by blower 68 and picks up hot powdered catalyst from line 69 controlled by valve 71 as it comes from heater 11. The resulting stream of hot catalyst-laden reactants are passed into reactor 12 at high velocity and further reaction between the feed constituents takes place. Powdered catalyst gradually drops to the bottom of reactor 12 and again passes into line 61 via line 63. Hot effluents from reactor 12 pass via cyclone separator 72 and line 42 to separation means 43. The temperature of the effluents may be dropped quickly to the desired degree by injection into line 42 of a desirable quenching fluid via line 53 and the temperature automatically controlled by temperature recorder-controller 55 in communication with line 42 and valve 54. Lines 44, 45, 46, and 47 are product take-off lines. Unreacted feed, $H_2$, ethylene and/or acetylene may be conveniently recycled thru lines 48 and 49 controlled by valves 51 and 52.

The embodiment illustrated in Fig. 1 has a wider application and is more suitable for higher temperatures than the embodiment illustrated in Fig. 2. The latter is more advantageous in catalytic operation but may also be used with powdered, non-catalytic, heat-transfer material.

Yields vary with temperatures, type of reactant, ratio of reactants, and reaction time. Unsaturated hydrocarbons, such as $C_2H_2$, give greater yields than saturated hydrocarbons, such as methane. Operating with a feed consisting of $NH_3$ and $C_2H_2$ in a ratio of N to C of 1 to 2, a temperature of 2750° F. and a reaction time of 0.06 second, a yield of over 90% (based upon the ammonia converted to HCN) is obtained. Under optimum conditions with $CH_4$ and $NH_3$ as feed, yields of more than 60% (based upon $NH_3$ converted to HCN) are obtained. When operating with CO and $NH_3$ as feed, yields on the same basis run as high as 80%.

It is believed that high yields obtained when operating according to the invention are due to rapid heating of reactants, to extremely high temperatures, and to the prevention of contact of reactants with metal reactor walls. When reacting $NH_3$ and hydrocarbons in externally heated metal tubes none of these advantages is available. The process of the invention provides the further advantage of continuous production of HCN at extremely high rates. Reconditioning of heat-transfer elements, whether catalytic or relatively non-catalytic, continuously in heater 11 prevents intermittent operation usually required to recondition the catalyst. This invention has a considerable advantage in economy as well as in efficiency over processes requiring heating by electricity.

Various modifications of the invention will be apparent to those skilled in the art. For example, in operation with powdered catalyst, a plurality of separators may be advantageous where only one is shown in Figure II of the drawing. The illustrative details disclosed are not to be construed as imposing unnecessary limitations on the invention.

I claim:

1. A continuous process for manufacturing HCN which comprises continuously flowing by gravity a contiguous fluent mass of hot ⅛" to 1" spherical refractory non-catalytic pebbles thru a series of substantially vertically arranged zones comprising a pebble heating zone and a reaction zone positioned below said pebble heating zone and communicating therewith thru an unobstructed relatively narrow elongated zone, each of said zones being substantially filled with said contiguous mass of pebbles and permitting relatively unrestricted flow of pebbles therethru; regulating the flow of pebbles through said zones solely at a point downstream of the lowermost of said zones so as to maintain a compact and contiguous stream of pebbles extending through said zones; continuously contacting that section of said contiguous mass of pebbles flowing thru said pebble heating zone with a stream of hot gas at a temperature and flow rate regulated to insure heating of said pebbles to a temperature substantially above a predetermined reaction temperature in the range of 1500° to 3000° F.; continuously contacting that section of said contiguous mass of pebbles flowing thru said reaction zone with a stream of reactant gases comprising $NH_3$ and a carbon compound from the group consisting of CO and low molecular weight hydrocarbons at a gas-flow rate regulated to maintain said reactant gases at said predetermined reaction temperature solely by heat transfer from said pebbles whereby a substantial portion of said reactants are converted to HCN; continuously removing pebbles from the reaction zone; continuously introducing pebbles to said pebble heating zone; and recovering effluents from the reaction zone.

2. A continuous process for manufacturing HCN which comprises continuously flowing by gravity a contiguous fluent mass of hot 1/8" to 1" spherical refractory non-catalytic pebbles thru a series of substantially vertically arranged zones comprising a pebble heating zone and a reaction zone positioned below said pebble heating zone and communicating therewith thru an unobstructed relatively narrow elongated zone, each of said zones being substantially filled with said contiguous mass of pebbles and permitting relatively unrestricted flow of pebbles therethru; regulating the flow of pebbles through said zones solely at a point downstream of the lowermost of said zones so as to maintain a compact and contiguous stream of pebbles extending through said zones; continuously contacting that section of said contiguous mass of pebbles flowing thru said pebble heating zone with a countercurrent stream of hot gas so as to heat same to a temperature above a predetermined reaction temperature in the range of 1500° to 3000° F.; continuously contacting that section of said contiguous mass of pebbles flowing thru said reaction zone with a preheated countercurrent stream of reactant gases comprising $NH_3$ and a carbon-containing gas from the group consisting of CO and low molecular weight hydrocarbons; continuously quenching effluents from the reaction zone; continuously removing pebbles from the lower portion of said reaction zone; continuously introducing pebbles to the upper portion of said pebble heating zone; simultaneously controlling and correlating the temperature of said hot gas, the rate of pebble flow, and the rate of flow of said stream of reactant gases so as to maintain said predetermined reaction temperature solely by heat transfer from said pebbles, whereby a substantial portion of said reactants are converted to HCN; and recovering HCN.

3. The process of claim 2 in which the reactant gases comprises $NH_3$ and CO in a ratio of between about 1:25 and 1:0.5.

4. The process of claim 2 in which the reactant gases comprise $NH_3$ and a low molecular weight hydrocarbon in a ratio of N to C of between about 1:5 and 1:0.3.

5. A continuous process for manufacturing HCN which comprises continuously flowing by gravity a contiguous fluent mass of hot pebbles consisting of non-catalytic alumina spheres 1/8" to 1" in diameter thru a series of substantially vertically arranged zones comprising a pebble heating zone, and a reaction zone positioned below said pebble heating zone and communicating therewith thru an unobstructed relatively narrow elongated zone, each of said zones being substantially filled with said contiguous mass of pebbles and permitting relatively unrestricted flow of pebbles therethru; regulating the flow of pebbles through said zones solely at a point downstream of the lowermost of said zones so as to maintain a compact and contiguous stream of pebbles extending through said zones; continuously contacting that section of said contiguous mass of pebbles flowing thru said pebble heating zone with a countercurrent stream of hot gas; continuously contacting that section of said contiguous mass of pebbles flowing thru said reaction zone with a preheated countercurrent stream of reactant gases comprising $NH_3$ and CO in a ratio of between about 1:25 and 1:0.5; continuously quenching effluents from the reaction zone; continuously removing pebbles from the lower portion of said reaction zone; continuously introducing pebbles to the upper portion of said pebble heating zone; simultaneously controlling and correlating the temperature of said hot gas, the rate of pebble flow, and the rate of flow of said stream of reactant gases so as to maintain a predetermined reaction temperature within the range of 1500° F. to 3000° F., solely by heat transfer from said pebbles, whereby a substantial portion of said reactants are converted to HCN; and recovering HCN.

6. A continuous process for manufacturing HCN which comprises continuously flowing by gravity a contiguous fluent mass of hot pebbles consisting of non-catalytic, glazed alumina spheres 1/8" to 1" in diameter thru a series of substantially vertically arranged zones comprising a pebble heating zone and a reaction zone positioned below said pebble heating zone and communicating therewith thru an unobstructed relatively narrow elongated zone, each of said zones being substantially filled with said contiguous mass of pebbles and permitting relatively unrestricted flow of pebbles therethru; regulating the flow of pebbles through said zones solely at a point downstream of the lowermost of said zones so as to maintain a compact and contiguous stream of pebbles extending through said zones; continuously contacting that section of said contiguous mass of pebbles flowing thru said pebble heating zone with a countercurrent stream of hot gas; continuously contacting that section of said contiguous mass of pebbles flowing thru said reaction zone with a preheated countercurrent stream of reactant gases comprising $NH_3$ and an unsaturated low molecular weight hydrocarbon; continuously quenching effluents from the reaction zone; continuously removing pebbles from the lower portion of said reaction zone; continuously introducing pebbles to the upper portion of said pebble heating zone; simultaneously controlling and correlating the temperature of said hot gas, the rate of pebble flow, and the rate of flow of said stream of reactant gases so as to maintain a predetermined reaction temperature within the range of 1500° to 3000° F. solely by heat transfer from said pebbles, whereby a substantial portion of said reactants are converted to HCN; and recovering HCN.

7. A continuous process for manufacturing HCN which comprises continuously flowing by gravity a contiguous fluent mass of hot pebbles consisting of non-catalytic, glazed alumina spheres 1/8" to 1" in diameter thru a series of substantially vertically arranged zones comprising a pebble heating zone and a reaction zone positioned below said pebble heating zone and communicating therewith thru an unobstructed relatively narrow elongated zone, each of said zones being substantially filled with said contiguous mass of pebbles and permitting relatively unrestricted flow of pebbles therethru; regulating the flow of pebbles through said zones solely at a point downstream of the lowermost of said zones so as to maintain a compact and contiguous stream of pebbles extending through said zones; continuously contacting that section of said contiguous mass of pebbles flowing thru said pebble heating zone with a countercurrent stream of hot gas; continuously contacting that section of said contiguous mass of pebbles flowing thru said reaction zone with a preheated countercurrent stream of reactant gases comprising $NH_3$ and $C_2H_2$; continuously quenching effluents from the reaction zone; continuously removing pebbles from the lower portion of said reaction zone; continuously introducing pebbles to the upper portion of said pebble heating zone; simultaneously controlling and correlating the temperature of said hot gas, the rate of pebble flow, and the rate of flow of said stream of reactant gases so as to maintain a predetermined reaction temperature within the range of 1500° to 3000° F. solely by heat transfer from said pebbles, whereby a substantial portion of said reactants are converted to HCN; and recovering HCN.

8. A continuous process for manufacturing HCN which comprises continuously flowing by gravity a contiguous fluent mass of hot pebbles consisting of non-catalytic glazed alumina spheres 1/8" to 1" in diameter thru a series of substantially vertically arranged zones comprising a pebble heating zone and a reaction zone positioned below said pebble heating zone and communicating therewith thru an unobstructed relatively narrow elongated zone, each of said zones being substantially filled with said contiguous mass of pebbles and permitting relatively unrestricted flow of pebbles therethru; regulating the flow of pebbles through said zones solely at a point downstream of the lowermost of said zones so as to maintain a compact and contiguous stream of pebbles extending through said zones; continuously contacting that section of said contiguous mass of pebbles flowing thru said pebble heating zone with a countercurrent stream of hot gas; continuously contacting that section of said contiguous mass of pebbles flowing thru said reaction zone with a preheated countercurrent stream of reactant gases comprising $NH_3$ and $CH_4$; continuously quenching effluents from the reaction zone; continuously removing pebbles from the lower portion of said reaction zone; continuously introducing pebbles to the upper portion of said pebble heating zone; simultaneously controlling and correlating the temperature of said hot gas, the rate of pebble flow, and the rate of flow of said stream of reactant gases so as to maintain a predetermined reaction temperature within the range of 1800° to 3000° F. solely by heat transfer from said pebbles, whereby a substantial portion of said reactants are converted to HCN; and recovering HCN.

CHARLES W. PERRY.

REFERENCES CITED

The following references are of record in the file of this patent:

UNITED STATES PATENTS

| Number | Name | Date |
|---|---|---|
| 1,610,035 | Bredig et al. | Dec. 7, 1926 |
| 1,982,407 | Wheeler | Nov. 27, 1934 |
| 2,069,545 | Carlisle et al. | Feb. 2, 1937 |
| 2,387,378 | Wolk | Oct. 23, 1945 |
| 2,389,636 | Ramseyer | Nov. 27, 1945 |
| 2,477,042 | Burnside | July 26, 1949 |